United States Patent
Jurzak et al.

(10) Patent No.: US 12,039,082 B2
(45) Date of Patent: Jul. 16, 2024

(54) SYSTEM AND METHOD FOR ANONYMIZING A PERSON CAPTURED IN AN IMAGE

(71) Applicant: MOTOROLA SOLUTIONS, INC., Chicago, IL (US)

(72) Inventors: Pawel Jurzak, Cracow (PL); Mateusz Smetek, Skala (PL)

(73) Assignee: Motorola Solutions, Inc., Chicago, IL (US)

( * ) Notice: Subject to any disclaimer, the term of this patent is extended or adjusted under 35 U.S.C. 154(b) by 219 days.

(21) Appl. No.: 17/884,048

(22) Filed: Aug. 9, 2022

(65) Prior Publication Data
US 2024/0054247 A1    Feb. 15, 2024

(51) Int. Cl.
G06F 21/62    (2013.01)

(52) U.S. Cl.
CPC ................ G06F 21/6254 (2013.01)

(58) Field of Classification Search
CPC ............ G06F 21/6245–6254; G06T 2207/30196–30201; G06V 20/50–52; G06V 40/16–176
See application file for complete search history.

(56) References Cited

U.S. PATENT DOCUMENTS

| | | |
|---|---|---|
| 6,807,569 B1 | 10/2004 | Bhimani et al. |
| 7,234,059 B1 | 6/2007 | Beaver et al. |
| 7,472,093 B2 | 12/2008 | Juels |
| 10,140,321 B2 | 11/2018 | Hakkani-Tur et al. |
| 10,321,278 B2 | 6/2019 | Proctor |
| 2008/0154819 A1 | 6/2008 | Boies et al. |
| 2010/0169332 A1 | 7/2010 | Bezzi |
| 2010/0268719 A1* | 10/2010 | Cormode .......... G06Q 30/02 707/E17.046 |
| 2011/0246895 A1 | 10/2011 | Roulliere et al. |

(Continued)

FOREIGN PATENT DOCUMENTS

| | | |
|---|---|---|
| CN | 103955481 B | 4/2018 |
| KR | 20160096012 A | 8/2016 |
| WO | 2017003494 A1 | 1/2017 |

OTHER PUBLICATIONS

S. Lohiya and L. Ragha, "Privacy Preserving in Data Mining Using Hybrid Approach," 2012 Fourth International Conference on Computational Intelligence and Communication Networks, Mathura, India, 2012, pp. 743-746, doi: 10.1109/CICN.2012.166.

(Continued)

*Primary Examiner* — Kevin Bechtel
(74) *Attorney, Agent, or Firm* — Raguraman Kumaresan

(57) ABSTRACT

A process of anonymizing a person captured in an image. An anonymization server receives a request from an agency to anonymize a person captured in an image including an unredacted facial feature corresponding to the person and an unredacted non-facial feature. The server redacts the facial feature captured in the image to generate a first redacted image. The server then identifies a second image accessible to users not associated with the agency. When the server determines that the anonymity of the person captured in the first redacted image can be compromised using unredacted facial and non-facial features captured in the second image, the server further redacts the non-facial feature captured in the image.

20 Claims, 9 Drawing Sheets

(56) References Cited

U.S. PATENT DOCUMENTS

| | | |
|---|---|---|
| 2013/0066818 A1 | 3/2013 | Assadollahi et al. |
| 2015/0244681 A1 | 8/2015 | Blumenfeld et al. |
| 2015/0304300 A1 | 10/2015 | Bender et al. |
| 2017/0359313 A1 | 12/2017 | Livneh et al. |
| 2021/0004485 A1 | 1/2021 | Summers et al. |
| 2021/0056231 A1* | 2/2021 | Kwatra ............... H04W 12/63 |
| 2021/0084194 A1* | 3/2021 | Rakshit ............... G06V 40/164 |

OTHER PUBLICATIONS

C. Chatzigeorgiou, L. Toumanidis, D. Kogias, C. Patrikakis and E. Jacksch, "A communication gateway architecture for ensuring privacy and confidentiality in incident reporting," 2017 IEEE 15th International Conference on Software Engineering Research, Management and Applications (SERA), London, 2017, pp. 407-411, doi: 10.1109/SERA.2017.7965759.

\* cited by examiner

SYSTEM AND METHOD FOR ANONYMIZING A PERSON CAPTURED IN AN IMAGE

BACKGROUND

Organizations such as public safety agencies and private enterprises capture and store large amounts of images for investigation or record purposes. Many law enforcement agencies have adopted body-worn cameras for their officers to provide transparency into police interactions. Sometimes law enforcement agencies publicly release images, for example, body-worn camera recordings of police-public confrontations. Also, many public and private organizations share images captured by their surveillance cameras with other organizations for investigation or record purposes. Such images frequently capture the identity of individuals whose privacy may need to be protected for safety and legal reasons.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
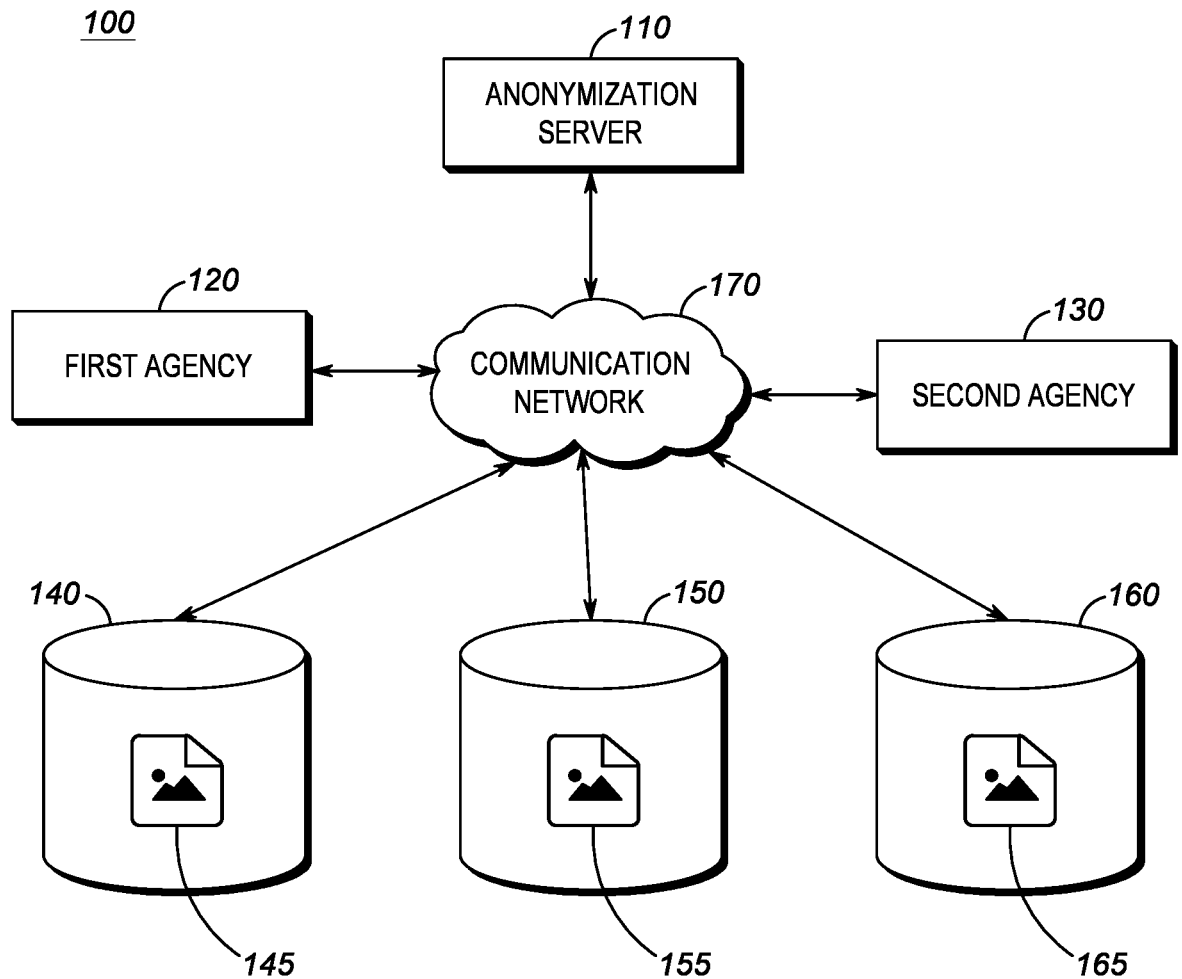
FIG. 1 is a block diagram of a system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

As described above, agencies often share images (still or moving images) owned/captured by them with other agencies for investigation or record purposes. Also, sometimes agencies release images captured by them on public platforms (e.g., social media, press etc.,) to provide transparency into their investigation or to seek information about persons, objects, or events captured in the images. Such images often capture the identity of private individuals whose privacy may need to be protected for safety or legal reasons. Digital redaction techniques are used to anonymize the identity of a person captured in an image, for example, by blurring, masking, or removing a facial feature of the person. However, redacting a facial feature of the person may not be always sufficient to preserve the anonymity of the person captured in the image. On the other hand, sharing an image in which a substantial portion of the image is redacted will result in loss of information that would have been otherwise valuable for investigation or record purposes. For example, assume a public-safety agency such as a police department has shared a redacted version of a first image with a person's redacted face on a social media platform. Further assume a second image of the same person with clothing and/or scene background similar to the first image but in an unredacted form was made publicly available by a different source (e.g., a news agency). In this case, since the person's clothing and scene background are similar in both the publicly available images (i.e., the redacted image corresponding to the first image and the second image in unredacted form), the anonymity of the person captured in the first image can be compromised using the person's clothing or scene background captured in the second unredacted image even though the person's face is redacted in the first image before being shared on the social media platform by the public-safety agency. Accordingly, disclosed below is an improved system and process that ensures that the anonymity of a person captured in a redacted image cannot be compromised using other publicly or privately accessible images capturing the same person.

One embodiment provides a method of anonymizing a person captured in an image. The method comprises: receiving, at an anonymization server, a request to anonymize a person captured in a first image, wherein the first image in an unredacted form is accessible only to one or more users associated with a first agency; analyzing, at the anonymization server, the first image to identify a first unredacted facial feature corresponding to the person and a first unredacted non-facial feature corresponding to the person or a background portion of the first image; redacting, at an anonymization server, the first unredacted facial feature captured in the first image to generate a first redacted image including a first redacted facial feature and the first unredacted non-facial feature; identifying, at the anonymization server, a second image which is accessible to one or more users not associated with the first agency; analyzing, at the anonymization server, the second image to identify a second unredacted facial feature and a second unredacted non-facial feature; determining, at the anonymization server, that the anonymity of the person captured in the first redacted image can be compromised using one or more unredacted features captured in the second image when the first unredacted facial feature captured in the first image matches with the second unredacted facial feature captured in the second image and the first unredacted non-facial feature captured in the first image matches with the second unredacted non-facial feature captured in the second image; and redacting, at the anonymization server, the first unredacted non-facial feature captured in the first redacted image to generate a second redacted image including the first redacted facial feature and a first redacted non-facial feature.

Another embodiment provides an anonymization server, comprising: a communications unit; and an electronic processor communicatively coupled to the communications unit. The electronic processor is configured to: receive, via the communications unit, a request to anonymize a person captured in a first image, wherein the first image in an unredacted form is accessible only to one or more users associated with a first agency; analyze the first image to identify a first unredacted facial feature corresponding to the person and a first unredacted non-facial feature corresponding to the person or a background portion of the first image; redact the first unredacted facial feature captured in the first image to generate a first redacted image including a first redacted facial feature and the first unredacted non-facial feature; identify a second image which is accessible to one or more users not associated with the first agency; analyze the second image to identify a second unredacted facial feature and a second unredacted non-facial feature; determine that the anonymity of the person captured in the first redacted image can be compromised using one or more unredacted features captured in the second image when the first unredacted facial feature captured in the first image matches with the second unredacted facial feature captured in the second image and the first unredacted non-facial feature captured in the first image matches with the second unredacted non-facial feature captured in the second image; and redact the first unredacted non-facial feature captured in the first redacted image to generate a second redacted image including the first redacted facial feature and a first redacted non-facial feature.

Each of the above-mentioned embodiments will be discussed in more detail below, starting with example system and device architectures of the system in which the embodiments may be practiced, followed by an illustration of processing blocks for achieving an improved technical method, device, and system for anonymizing a person captured in an image. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Referring now to the drawings, and in particular FIG. 1, a system 100 is shown including an anonymization server 110 configured to provide an anonymization service on behalf of agencies 120, 130 corresponding to images shared by an agency (e.g., a first agency 120) on a public platform (e.g., a social media platform) or with another agency (e.g., a second agency 130). In accordance with embodiments, the anonymization service provided on behalf of an agency includes anonymizing one or more persons captured in an image and further ensuring that the anonymity of the persons cannot be compromised using similar images that are accessible by public members and/or members of other agencies. Agencies 120, 130 are organizational entities that may store (e.g., in one or more databases 140, 150, 160), retrieve, and/or process various types of data records (e.g., images 145, 155, 165 stored respectively in databases 140, 150, 160) related to the organization's goals, activities, resources, and the like. In some embodiments, agencies 120, 130 may represent a private enterprise organization such as press, media, utilities, oil/gas, electric, private security, or other business. In other embodiments, agencies 120, 130 may represent a public organization such as a public-safety agency (e.g., police, fire, emergency medical service), governmental entity (e.g., court, city administration), and the like. As an example, the first agency 120 may represent a police department and the second agency 130 may represent a medical department. As another example, the first agency 120 may represent a police department and the second agency 130 may represent a news broadcasting service. Each agency 120, 130 respectively employs one or more computing devices that are configured to perform computing functions on behalf of agencies such as receiving, storing, processing, and sharing images (still or moving images in unredacted or redacted forms) captured by cameras (not shown) (e.g., surveillance cameras, vehicle cameras, body-worn cameras, mobile device cameras, drone cameras, etc.,) that may be controlled and/or owned by the respective agencies 120, 130. Such images captured by cameras that are owned and/or controlled by a particular agency may be referred herein as images owned by the particular agency or associated with the particular agency. For example, as shown in FIG. 1, the agency 120 (also referred to as a "first agency" 120) stores images (e.g., image 145) captured by the cameras controlled or owned by the agency 120 at a database 140. Similarly, the agency 130 (also referred to as a "second agency" 130) stores images (e.g., image 155) captured by the cameras controlled or owned by the agency 130 at the database 150. In accordance with some embodiments, the second agency 130 does not have access to an image (e.g., image 145) stored in the database 140 associated with the first agency 120 unless the image is made available by the first agency 120, for example, by publishing the image 145 on a social media platform, or by privately sharing the image 145 with the second agency 130. Similarly, the first agency 120 does not have access to an image (e.g., image 155) stored in the database 150 associated with the second agency 130 unless the image is made available by the second agency 130, for example, by publishing the image 155 on a social media platform, or by privately sharing the image 155 with the first agency 120. The images 145, 155 may be redacted (e.g., to anonymize the identity of persons captured in the images) by the respective agencies 120, 130 before sharing them with other agencies or on public platforms. Also, shown in FIG. 1 is a database 160 which stores images (e.g., image 165) that are accessible by public members (e.g., anyone with access to the internet) without any restriction. For example, the image 165 may correspond to an unredacted image that is shared via a social media platform by a public member. In some embodiments, the images 145, 155, 165 may represent images that are captured particularly corresponding to an incident. As used herein, the term "incident" may refer to an event, occurrence, or situation that an agency (e.g., agency 120 or agency 130) has been tasked to resolve (e.g., a traffic accident, public disturbance, medical emergency, fire, broken water meter or power line, etc.).

The databases 140, 150, 160 may be accessible via one or more communication networks 170. The communication network 170 includes wireless and wired connections. For example, the communication network 170 may be implemented using a wide area network, such as the Internet, a local area network, such as a Wi-Fi network, and personal area or near-field networks, for example a Bluetooth™ network. Portions of the communications network 170 may include a Long Term Evolution (LTE) network, a Global System for Mobile Communications (or Groupe Special Mobile (GSM)) network, a Code Division Multiple Access (CDMA) network, an Evolution-Data Optimized (EV-DO) network, an Enhanced Data Rates for GSM Evolution (EDGE) network, a 3G network, a 4G network, a 5G network, and combinations or derivatives thereof.

While only two agencies 120, 130 and one anonymization server 110 are shown as being included in the system 100, the system 100 may include any number of agencies and anonymization servers where different agencies may request and/or subscribe to a different one of the anonymization servers to provide anonymization services corresponding to images shared with other agencies or on public platforms.

Figure 2:
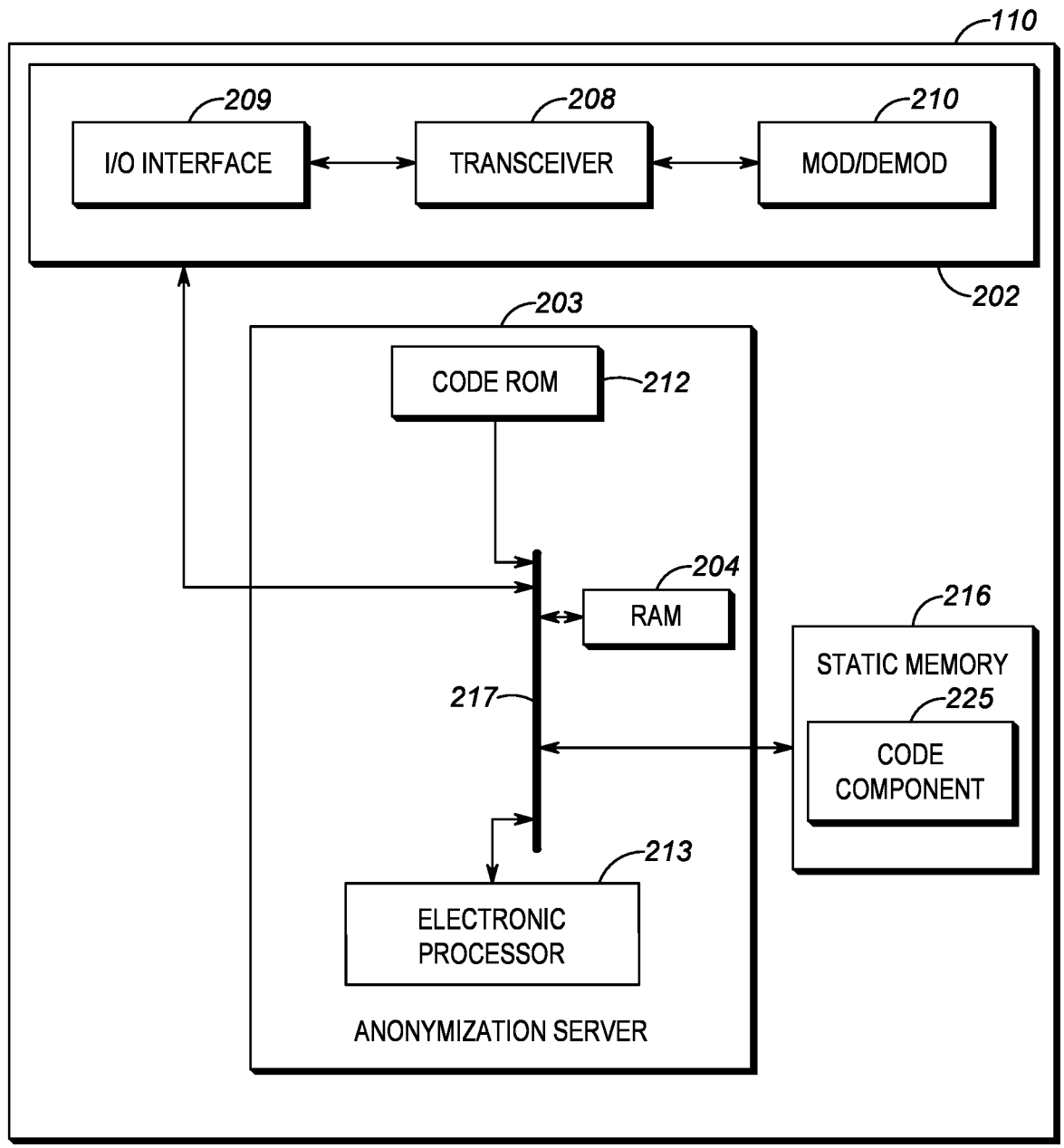
FIG. 2 is a block diagram of an anonymization server shown in FIG. 1 in accordance with some embodiments.

FIG. 2 is an example functional block diagram of an anonymization server 110 operating within the system 100 in accordance with some embodiments. The anonymization server 110 may be embodied in computing devices not illustrated in FIG. 1, and/or may be a distributed computing device across two or more of the foregoing (or multiple of a same type of one of the foregoing) and linked via a wired and/or wireless communication link(s). While FIG. 2 represents an anonymization server 110 described above with respect to FIG. 1, depending on the type of server, the anonymization server 110 may include fewer or additional components in configurations different from that illustrated in FIG. 2.

As shown in FIG. 2, the anonymization server 110 includes a communications unit 202 (also referred to as a "communication interface") coupled to a common data and address bus 217 of a processing unit 203. The communications unit 202 sends and receives data to and from other devices in the system 100. The communications unit 202 may include one or more wired and/or wireless input/output (I/O) interfaces 209 that are configurable to communicate with other devices in the system 100. For example, the communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (for example, 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network. The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The processing unit 203 may include an encoder/decoder with a code Read Only Memory (ROM) 212 coupled to the common data and address bus 217 for storing data for initializing system components. The processing unit 203 may further include an electronic processor 213 (for example, a microprocessor, a logic circuit, an application-specific integrated circuit, a field-programmable gate array, or another electronic device) coupled, by the common data and address bus 217, to a Random Access Memory (RAM) 204 and a static memory 216. The electronic processor 213 may generate electrical signals and may communicate signals through the communications unit 202.

Figure 3:
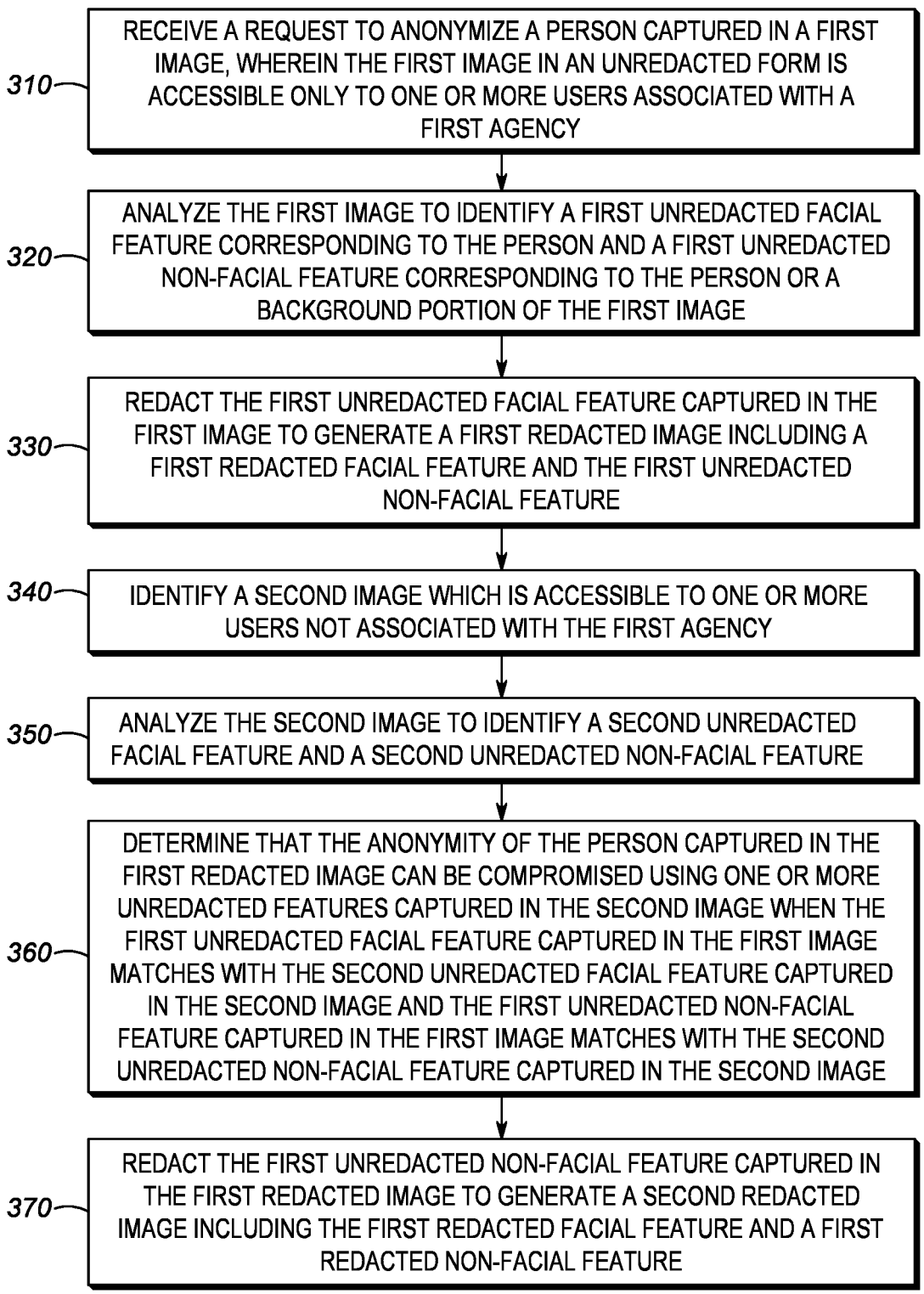
FIG. 3 illustrates a flowchart of a process for anonymizing a person captured in an image in accordance with some embodiments.

Static memory 216 may store operating code 225 for the electronic processor 213 that, when executed, performs one or more of the blocks set forth in FIG. 3 and the accompanying text(s). The static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, and the like. The static memory 216 may further store information required for the anonymization server 110 to provide anonymization services on behalf of one or more agencies (e.g., agency 120) corresponding to one or more images (e.g., image 145) shared by the agencies with one or more other agencies (e.g., agency 130) or on public platforms. In accordance with some embodiments, the anonymization server 110 receives a request from the first agency 120 to provide an anonymization service corresponding to an image 145 to be shared by the first agency 120 with another agency or on a public platform. In accordance with embodiments, the anonymization server 110 performs the anonymization service by anonymizing one or more persons captured in one or more images in accordance with the blocks set forth in FIG. 3.

Turning now to FIG. 3, a flowchart diagram illustrates a process 300 for anonymizing a person captured in an image. While a particular order of processing steps, message receptions, and/or message transmissions is indicated in FIG. 3 as an example, timing and ordering of such steps, receptions, and transmissions may vary where appropriate without negating the purpose and advantages of the examples set forth in detail throughout the remainder of this disclosure.

An anonymization server 110 shown in FIG. 1 and/or FIG. 2, and embodied as a singular computing device or distributed computing device may execute process 300 via an electronic processor 213.

The anonymization server 110 may execute the process 300 at power-on, at some predetermined periodic time period thereafter, in response to a trigger raised locally at the anonymization server 110 via an internal process or via an input interface or in response to a trigger from an external device (e.g., a computing device associated with an agency 120, 130) to which the anonymization server 110 is communicably coupled, among other possibilities. As an example, the anonymization server 110 is programmed to automatically trigger execution of the process 300 when a request to anonymize a person captured in an image (e.g., image 145 owned by the agency 120) is received from an agency, for example, via a computing device associated with an agency.

The process 300 of FIG. 3 need not be performed in the exact sequence as shown and likewise various blocks may be performed in different order or alternatively in parallel rather than in sequence. The process 300 may be implemented on variations of the system 100 of FIG. 1 as well. The process 300 will be described below with reference to the example images shown in FIGS. 4-9.

Figure 4:
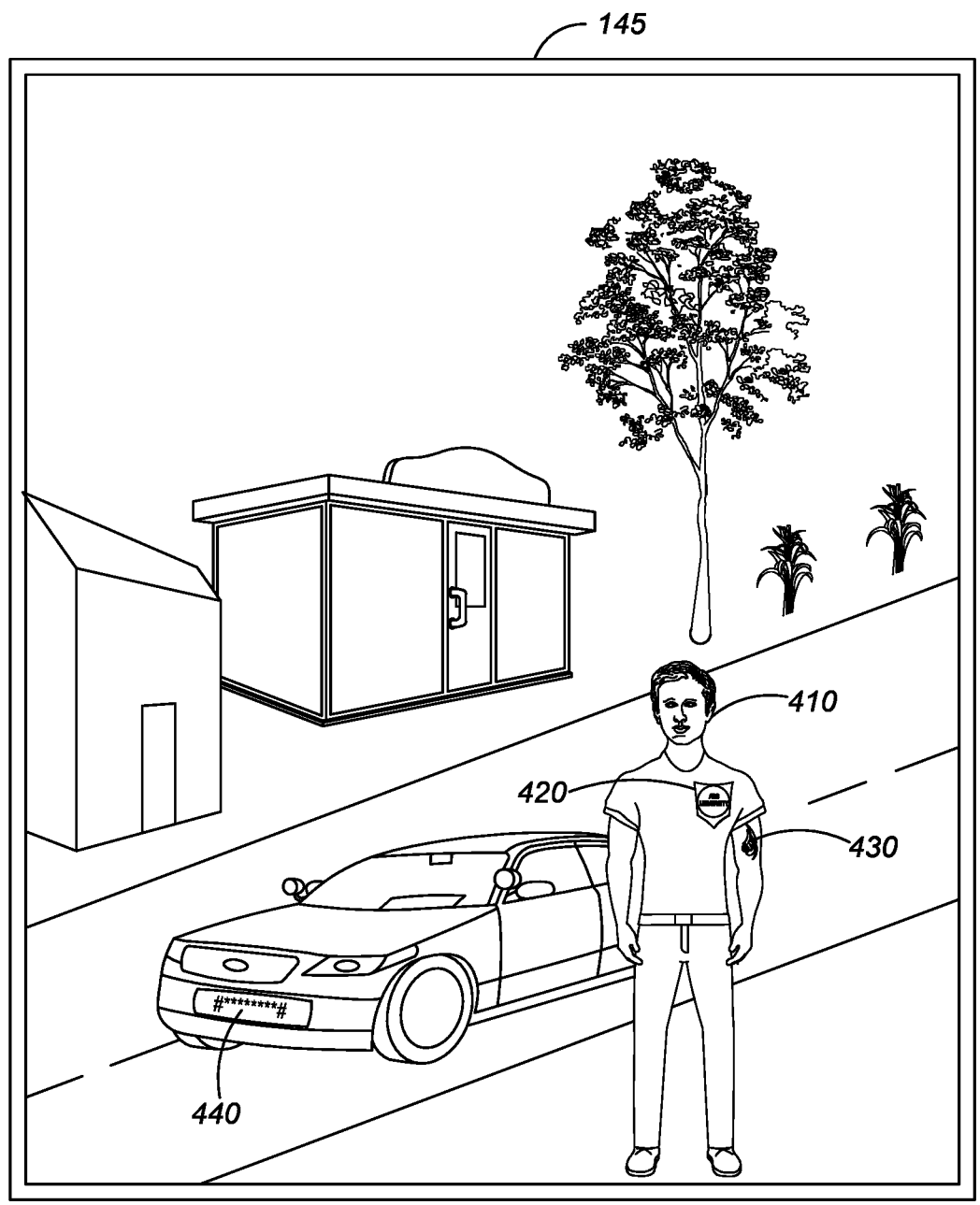
FIG. 4 shows an example of a first image accessible only to a first agency in an unredacted form capturing the identity of a person to be anonymized in accordance with the process shown in FIG. 3.

At block 310, the anonymization server 110 receives a request to provide an anonymization service for anonymizing a person captured in a first image (e.g., image 145 shown in FIG. 4). The request may be received from a computing device associated with a first agency 120 via the communication network 170. In accordance with some embodiments, the request may include an identifier that uniquely identifies the first image 145 as well as information identifying a particular person to be anonymized from the image 145. In some embodiments, the request for the anonymization service may additionally include a copy of the first image 145. The request may further include one or more of: agency information (e.g., name of agency, location of agency, agency credential etc.,) identifying the first agency 120, agency information (e.g., name of agency, location of agency etc.,) identifying the second agency 130 (or social media platform) to which the first image 145 is to be shared, information about the user requesting the anonymization service (e.g., name of user, agency to which the user is affiliated with, user credential etc.,), an identifier (e.g., a computer aided dispatch identifier) identifying an incident corresponding to which the first image 145 is captured, location of the incident, type of incident, and location of the incident.

In accordance with embodiments, the first image 145 is in an unredacted form and further is accessible only to one or more users associated with the first agency 120. In other words, the first image 145 cannot be accessed by any users (e.g., users associated with the second agency 130 or public members) outside of the first agency 120 until the anonymization server 110 has anonymized the person captured in the first image 145 in accordance with the process 300 and has further provided a redacted version (e.g., redacted image 900 shown in FIG. 9) of the first image 145 to the first agency 120 for sharing with the second agency or on public platforms.

In accordance with some embodiments, the anonymization server 110 processes the request received from the first agency 120 and determines whether the agency 120 or the user associated with the agency 120 requesting the anonymization service is authorized or subscribed to receive the anonymization service from the anonymization server 110. For example, the anonymization server 110 verifies the credentials of the agency 120 or the user associated with the agency 120 to determine whether the agency 120 or the user associated with the agency 120 requesting the anonymization service is authorized or subscribed to receive the anonymization service provided by the anonymization server 110. If the agency 120 or the user associated with the agency 120 is authorized or subscribed to receive the anonymization service, the anonymization server 110 transmits a response via the communication network 170. The response provides confirmation that the anonymization server 110 will provide the anonymization service corresponding to the image 145 identified in the request received from the agency 120. The anonymization server 110 further stores (e.g., at static memory 216) the information included in the request received from the first agency 120 to provide the anonymization service on behalf of the first agency 120.

At block 320, the anonymization server 110 analyzes the first image 145 using an image analytics engine. For example, the image analytics engine may include one or more object or feature classifiers that may be particularly trained to identify an instance of a person or more particularly to identify any segment within the image that reveals facial and/or non-facial features that can be used to identify a particular person's identity. Based on the analysis of the first image 145, the anonymization server 110 identifies a first unredacted facial feature corresponding to the person to be anonymized and a first unredacted non-facial feature corresponding to the person or a background portion of the first image. The facial feature of the person may include the face, eye (iris and retina), or some other visual feature appearing on the face of the person. The non-facial feature of the person may include the fingerprint, gesture, gait characteristic, body marks such as birthmarks, moles, body piercings, tattoos, scars, and other visual features appearing on the body or clothing of the person. The non-facial feature may also include a visual feature appearing on a background portion of the image (e.g., a sign on a building or a street, facial or body features of other persons or animals captured in the image, objects appearing in the background of the image such as bags, vehicles, vehicle license plate etc., or any other visual features not directly appearing on the face, body, or clothing of the person to be anonymized). As illustrated by the example image 145 shown in FIG. 4, the anonymization server 110 has analyzed the image 145 and has identified an unredacted facial feature 410 corresponding to the face of the person to be anonymized as well as unredacted non-facial features 420, 430, and 440. The unredacted non-facial feature 420 (also referred to as a "second unredacted non-facial feature") corresponds to an emblem appearing on the shirt worn by the person to be anonymized. The unredacted non-facial feature 430 corresponds to a tattoo appearing on the arm of the person to be anonymized. The unredacted non-facial feature 440 corresponds to a vehicle license plate appearing on a vehicle identified in a background portion of the first image 145.

At block 330, the anonymization server 110 redacts the first unredacted facial feature 410 captured in the first image 145 to generate a first redacted image including a first redacted facial feature and one or more unredacted non-facial features. For example, the anonymization server 110 redacts the first unredacted facial feature 410 captured in the first image 145 shown in FIG. 4 to generate a first redacted image 500 shown in FIG. 5. The first redacted image 500 shown in FIG. 5 includes a first redacted facial feature 510 (i.e., generated by redacting the first unredacted facial feature 410 captured in the first image 145 shown in FIG. 4) and a first unredacted non-facial feature 420 (i.e., the emblem appearing on the shirt worn by the person to be anonymized remains in an unredacted form in both the first image 145 shown in FIG. 4 as well as the first redacted image 500 shown in FIG. 5). The first redacted image 500 shown in FIG. 5 also includes other non-facial features 430 (i.e., the tattoo appearing on the arm of the person to be anonymized), 440 (vehicle license plate appearing in the background portion of the image) in unredacted forms. In accordance with embodiments, the anonymization server 110 does not redact the non-facial features (e.g., non-facial features 420, 430, 440) unless the anonymization server 110 determines (as further explained below with reference to blocks 340 through 370) that one or more unredacted features included in one or more images that are accessible outside of the first agency 120 can be used to compromise the anonymity of the person captured in the first image 145.

In accordance with some embodiments, the anonymization server 110 may apply a redaction technique automatically or in response to a user input indicating a selection of a particular image segment (e.g., frame number, time frame, specific image or an area within an image) corresponding to the first unredacted facial feature 420 of the person to be anonymized and a corresponding type of redaction technique (e.g., blurring, masking, removing, resizing etc.,) to be applied to the particular selected segment. In one embodiment, the redaction technique may involve application of a redaction filter (e.g., blur filter) to pixel values within an area of pixels (e.g., an area containing a facial feature 410 of the person) associated with an image to be redacted. The application of a redaction filter may modify optical characteristics (e.g., reduction of optical intensity) of one or more pixel values to which the filter is applied. The modification of the optical characteristics of the pixel values may make the area (e.g., an area showing the person's facial feature 410) within a particular image more coherent and less distinct, resulting in a redacted image. Alternatively, the redaction technique may also involve removing certain pixel values within an image or certain frames within an image containing data (e.g., person's facial feature 410) that is to be redacted.

In accordance with embodiments, the anonymization server 110 anonymizes a person captured in an image by redacting a minimum number of segments (e.g., pixels) or regions of the first image 145 that are sufficient to ensure anonymity of the person captured in the first image 145. The anonymization server 110 is configured, by default, to redact only the facial features of the person to be anonymized unless the anonymization server 110 determines that one or more non-facial features of the person to be anonymized are to be redacted based on images that are accessible outside of the first agency 120 showing similar facial and non-facial features as the first image 145. In one embodiment, the anonymization server 110 determines a minimum number of segments that are sufficient to ensure anonymity of the person by first checking if there are other images that are similar to the first image 145 and further accessible by one or more users (e.g., users associated with the second agency or public members) not associated with the first agency 120. If the anonymization server 110 does not find another image (accessible to users not associated with the first agency 120) capturing the identity of the same person captured in the first image 145, then the anonymization server 110 may determine that redacting a facial feature of the person (e.g., eyes or the entire face) is sufficient to ensure anonymity of the person captured in the first image. In this case, the anonymization server 110 does not execute the blocks 340 through 370 and also further does not redact the unredacted non-facial features included in the first image 145 or in subsequent images (e.g., redacted image 500) generated by redacting the first image 145. The anonymization server 110 further sends a notification sharing the first redacted image 500 with one or more users authorized with the first agency 120. Optionally, prior to sharing the first redacted image 500 with the first agency 120, the anonymization server 110 may continue to monitor, for a predefined period of time (e.g., 2 days), availability of new images (i.e., images that are accessible to users not associated with the first agency 120) that are similar to the first image 145. In one embodiment, the anonymization server 110 determines that an image (e.g., image 155 or image 165) is similar to the first image when a facial feature captured in the image substantially matches with a facial feature (e.g., facial feature 410) captured in the first image 145 and further when at least one non-facial feature captured in the image substantially matches with a non-facial feature (e.g., non-facial features 420, 430, or 440) captured in the first image 145. If in case an image similar to the first image 145 that is accessible outside of the first agency is made publicly available by another agency (eg., second agency), the anonymization server 110 executes the blocks 340 through 370 to determine if a redaction of non-facial features (e.g., non-facial features 420, 430, 440 captured in the redacted image 500 shown in FIG. 5) is further necessary to preserve the anonymity of the person captured in the first image 145.

Figure 7:
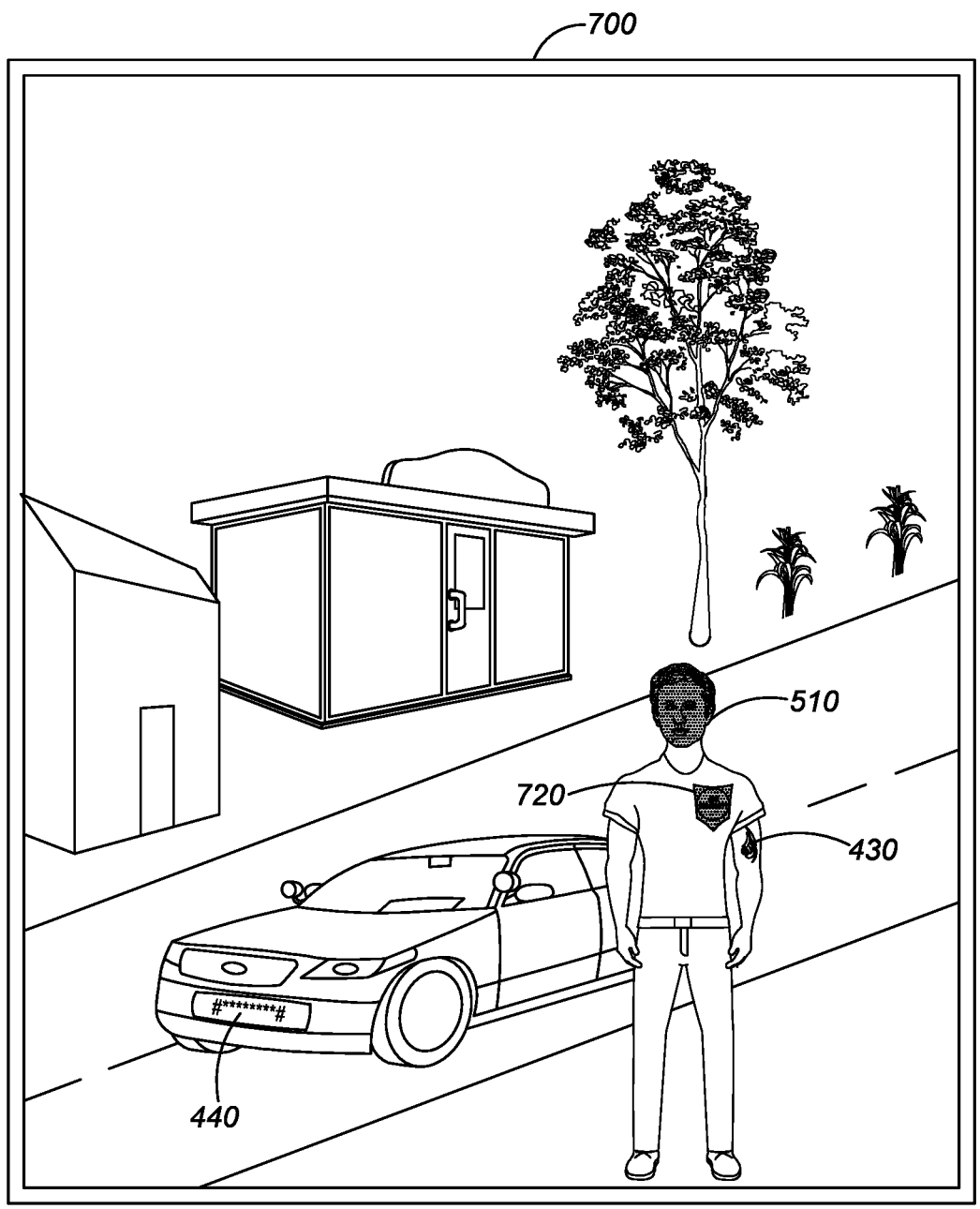
FIG. 7 shows an example of a second redacted image generated by redacting a first unredacted non-facial feature captured in the redacted image shown in FIG. 5.
Figure 8:
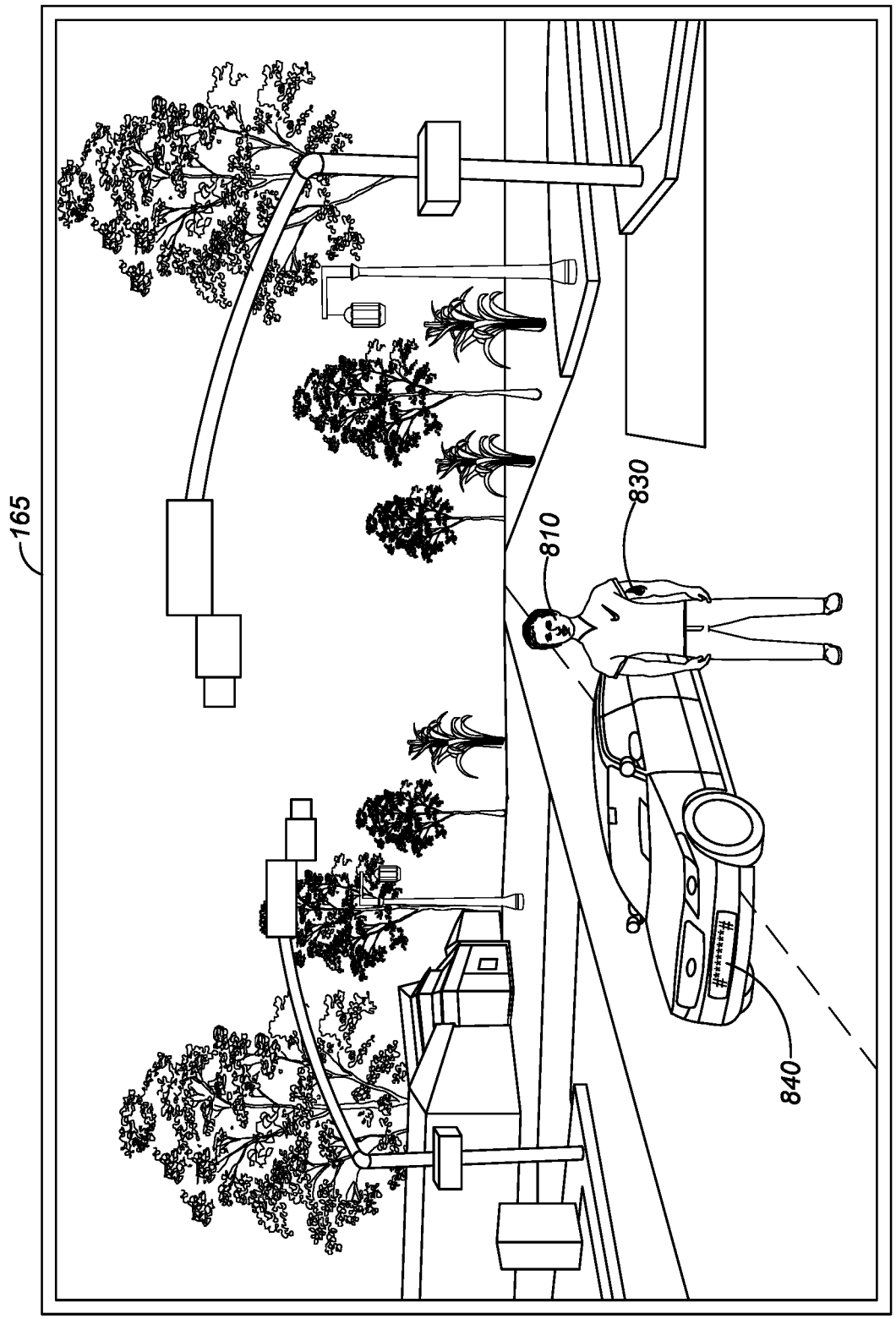
FIG. 8 shows an example of a third image that is publicly accessible in an unredacted form capturing the identity of the person also captured in the first image shown in FIG. 4.
Figure 9:
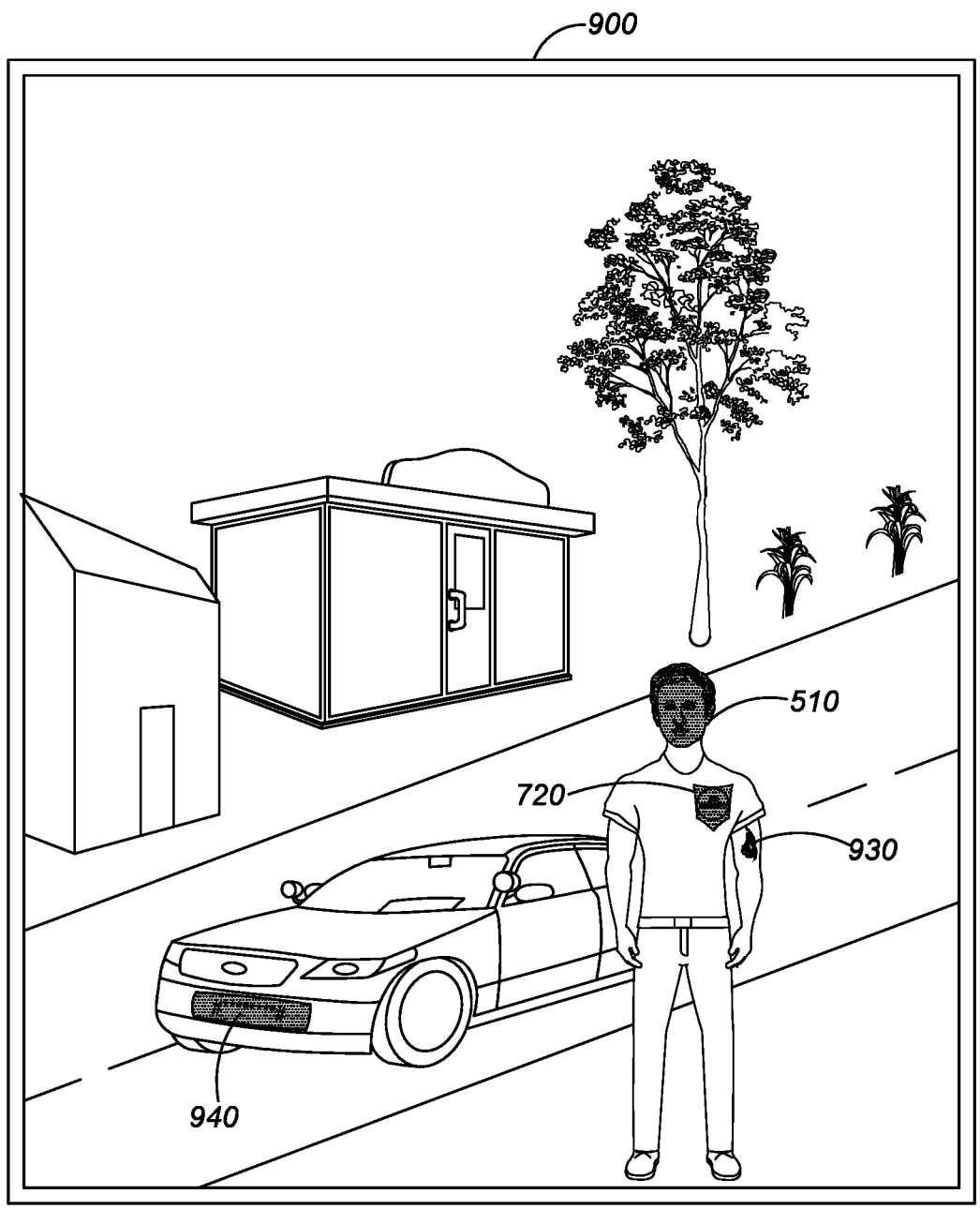
FIG. 9 shows an example of a third redacted image generated by redacting a second unredacted non-facial feature captured in the redacted image shown in FIG. 7.

At block 340, the anonymization server 110 identifies at least one other image (e.g., a second image 155 shown in FIG. 6) which is accessible to one or more users not associated with the first agency. The one or more users not associated with the first agency 120 may include, for example, users associated with the second agency 130 or alternatively public members including anyone who has access to the internet. In accordance with embodiments, the anonymization server 110 searches images published in social media platforms or other platforms that are instantly accessible via the communication network 170. For example, the third image 165 represents an image that is published in a social media platform and further accessible to public members. The anonymization server 110 may also search private platforms for images that are accessible by other agencies but not general public members. For example, the second image 155 represents an image that is captured by the second agency 130 and further privately shared with the first agency 120. In accordance with some embodiments, the anonymization server 110 may have access to images owned by or otherwise shared with the first agency 120. In accordance with some embodiments, the anonymization server 110 may search and identify images that substantially correlate in one or more of time, location, or content, with the first image 145. As an example, the anonymization server 110 may search for images that are captured in locations matching or in proximity to the location in which the first image 145 was captured. As another example, the anonymization server 110 may search for images that were captured during a similar time period (e.g., same day) as the first image. As a further example, the anonymization server 110 may search for images that were captured and tagged to the same incident to which the first image 145 is tagged. As a further example, the anonymization server 110 may search for images that substantially capture the same content (e.g., persons, buildings, background scene etc.,) as the first image 145. As shown in FIGS. 7 and 9, the anonymization server 110 may search and retrieve images 155, 165 that capture the same content (e.g., the person to be anonymized from the first image 145).

At block 350, the anonymization server 110 analyzes the second image 155 using the image analytics engine. For example, the image analytics engine may include one or more object or feature classifiers that may be particularly trained to identify an instance of a person or more particularly to identify any region within the image that reveals facial or non-facial features which can be used to identify a particular person's identity. Based on the analysis of the second image 155, the anonymization server 110 identifies a second unredacted facial feature 610 (e.g., face of a person captured in the second image 155) and a second unredacted non-facial feature 620 (e.g., an emblem appearing on a shirt worn by the person captured in the second image 155).

In accordance with embodiments, the anonymization server 110 determines whether the anonymity of the person captured in the first redacted image 500 (i.e., after the facial feature is redacted from the first image 145) can be compromised using one or more unredacted features (e.g., unredacted facial feature 610 and unredacted non-facial feature 620) captured in the second image 155. For example, the anonymization server 110 makes this determination by comparing or correlating the unredacted facial feature 410 captured in the first image 145 with the unredacted facial feature 610 captured in the second image 155 and further by comparing or correlating the unredacted non-facial feature 420 captured in the first image 145 with the second unredacted non-facial feature 620 captured in the second image 155.

If the unredacted facial feature 410 does not match with the second unredacted facial feature 610 or if the unredacted non-facial feature 420 does not match with the unredacted non-facial feature 620, then the anonymization server 110 does not redact the unredacted non-facial feature 420 captured in the first redacted image 500. Similarly, if the unredacted facial feature 410 matches with the second unredacted facial feature 610 and the unredacted non-facial feature 420 does not match with the second unredacted non-facial feature 620, then the anonymization server 110 determines that the anonymity of the person captured in the redacted image 500 cannot be compromised using the unredacted facial feature 610 or unredacted non-facial feature 620 captured in the second image 155.

On the other hand, at block 360, when the unredacted facial feature 410 in the first image 145 matches with the unredacted facial feature 610 captured in the second image 155 and the unredacted non-facial feature 420 captured in the first image matches with the unredacted non-facial feature 620 captured in the second image 155, the anonymization server 110 determines that the anonymity of the person captured in the first redacted image can be compromised using one or more of the unredacted features (i.e., unredacted facial feature 610 or unredacted non-facial feature 620) captured in the second image 155.

At block 370, when the anonymization server 110 determines that the anonymity of the person captured in the first redacted image 500 can be compromised using one or more unredacted features captured in the second image 155, the anonymization server 110 redacts the unredacted non-facial feature 420 captured in the first redacted image 500 to generate a second redacted image 700 (see FIG. 7) including the first redacted facial feature 510 and a first redacted non-facial feature 720. For example, the anonymization server 110 redacts the first unredacted non-facial feature 420 captured in the first redacted image 500 shown in FIG. 5 to generate a second redacted image 700 shown in FIG. 7. The second redacted image 700 shown in FIG. 7 includes the first redacted facial feature 510 (i.e., corresponding to the facial feature 410 included in a redacted form in the first redacted image 500 shown in FIG. 5) and the first redacted non-facial feature 720 (i.e., corresponding to a redacted version of the non-facial feature 420 which represents the emblem appearing on the shirt worn by the person to be anonymized).

Figure 5:
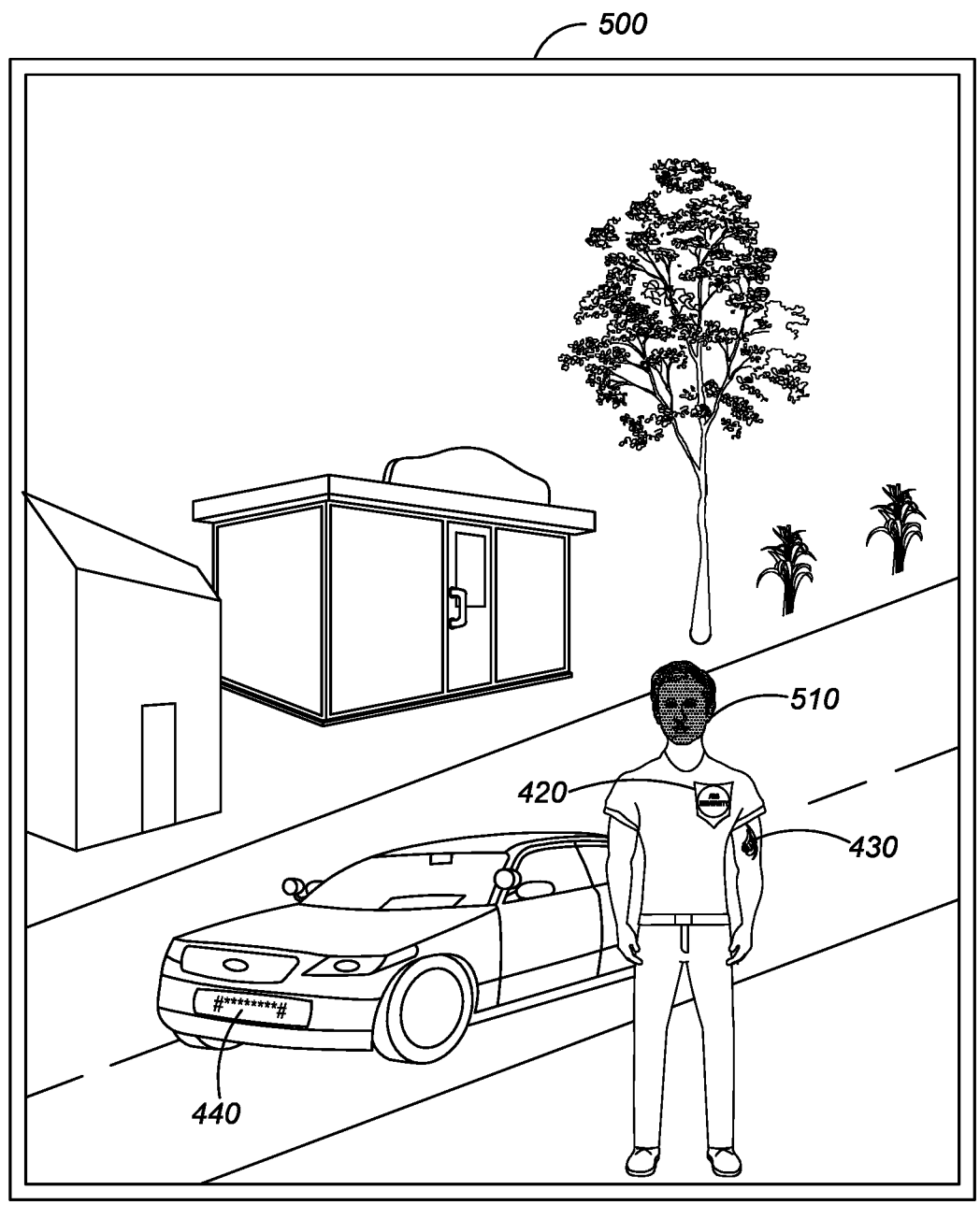
FIG. 5 shows an example of a first redacted image generated by redacting a facial feature of the person captured in the first image shown in FIG. 4.
Figure 6:
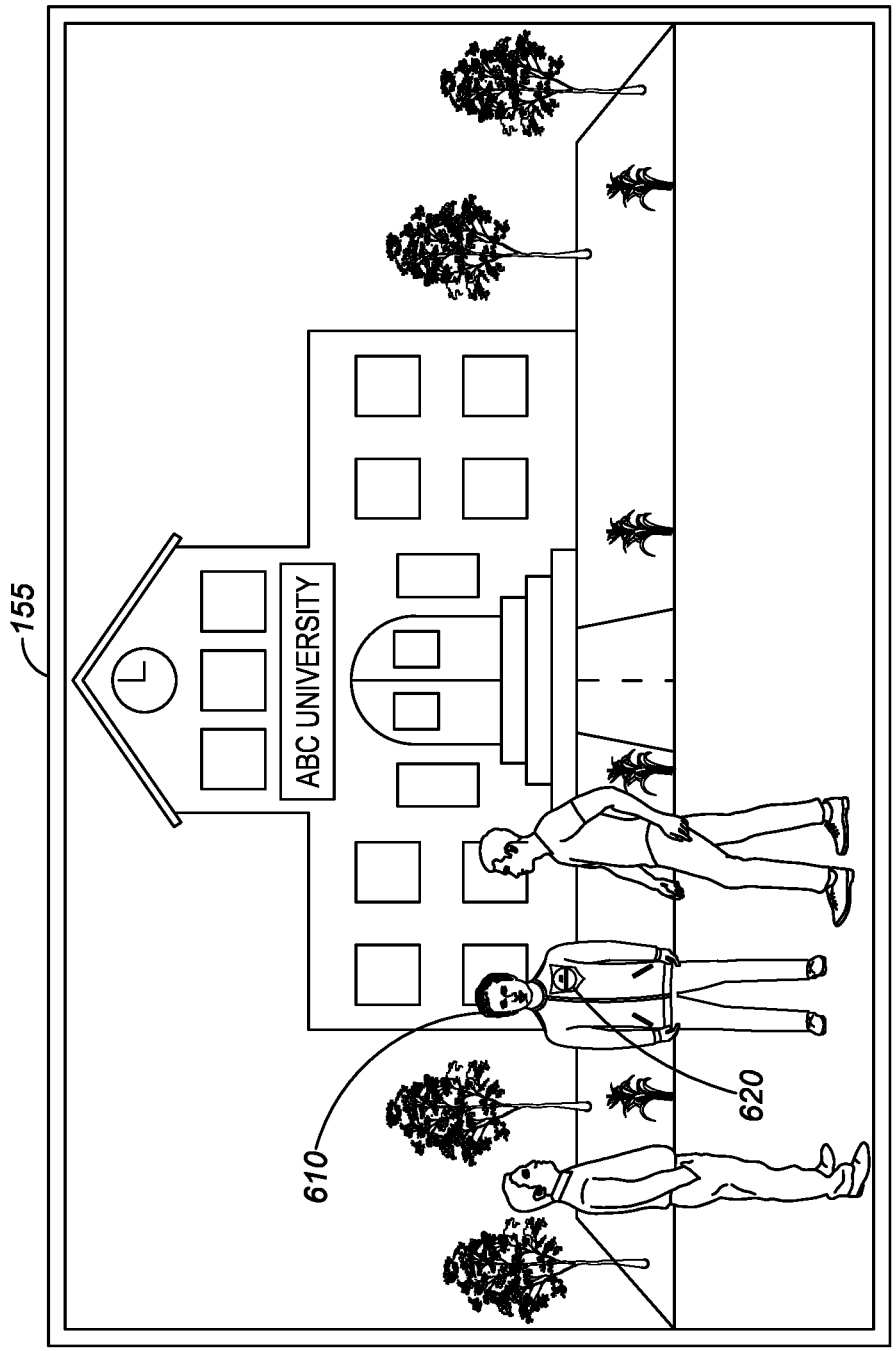
FIG. 6 shows an example of a second image accessible to one or more agencies outside of the first agency in an unredacted form capturing the identity of the person also captured in the first image shown in FIG. 4.

The first redacted image 500 shown in FIG. 5 includes a further unredacted non-facial feature 430 which corresponds to the tattoo appearing on the arm of the person to be anonymized remains. The non-facial feature 430 (i.e., tattoo) remains in an unredacted form in the first redacted image shown in FIG. 5 as well as the second redacted image 700 shown in FIG. 7). For example, in this case, the anonymization server 110 has determined that the anonymity of the person captured in the first redacted image 500 cannot be compromised using one or more of the unredacted features captured in the second image 155 shown in FIG. 6 because there is no correlation between the non-facial feature 430 (i.e., tattoo) captured in the first image 145 shown in FIG. 4 and any of the non-facial features including the unredacted non-facial feature 620 representing the emblem captured in the second image 155 shown in FIG. 6. Accordingly, in this example, the anonymization server 110 does not redact the unredacted non-facial feature 430 when generating the second redacted image 700 shown in FIG. 7.

In case the anonymization server 110 searches and identifies additional images (e.g., a third image 165 shown in FIG. 8) that are similar to the first image 145 and are further accessible to one or more users not associated with the first agency, the anonymization server 110 may repeat the execution of blocks 350-370 for each additional image and may further redact one or more non-facial features (e.g., unredacted non-facial feature 430) that remain in an unredacted form in the second redacted image 700 to ensure that the anonymity of the person captured in the second redacted image 700 cannot be compromised using one or more unredacted features captured in the additional images. In the example shown in FIG. 8, the anonymization server 110 has identified a third image 165 that is publicly accessible to anyone with the internet. The anonymization server 110 then analyzes the third image 165 to identify a facial feature 810 representing the face of the person to be anonymized and a non-facial feature 830 representing the tattoo appearing on the arm of the person to be anonymized. If the facial feature 810 included in the third image 165 matches with the first unredacted facial feature 410 captured in the first image 145 and the non-facial feature 830 matches with an unredacted non-facial feature 430 captured in the second redacted image 700, then the anonymization server 110 determines that the anonymity of the person captured in the second redacted image 700 can be compromised using one or more unredacted features captured in the third image 165. The anonymization server 110 then redacts the unredacted non-facial feature 430 representing the tattoo captured in the second redacted image 700 to generate a third redacted image 900 as shown in FIG. 9. The anonymization server 110 may similarly redact the unredacted non-facial feature 440 representing a vehicle license plate captured in the second redacted image 700 since the unredacted non-facial feature 440 matches with an unredacted non-facial feature 840 representing a vehicle license plate captured in the third image 165 shown in FIG. 8. Accordingly, the third redacted image 900 shown in FIG. 9 includes the redacted facial feature 510 (corresponding to the face of the person to be anonymized), the redacted non-facial feature 720 (corresponding to the emblem appearing on the shirt worn by the person to be anonymized), the redacted non-facial feature 930 (corresponding to the tattoo appearing on the arm of the person to be anonymized), and the redacted non-facial feature 940 (corresponding to the vehicle license plate on a vehicle appearing in proximity to the person to be anonymized).

In accordance with embodiments, the anonymization server 110 executes the blocks 350 through 370 to incrementally redact further non-facial features identified in the first image 145 to preserve the anonymity of the person captured in the first image until the anonymization server cannot find an additional image that is similar to the first image or accessible to users outside of the first agency 120. Further, the anonymization server 110 may repeat the execution of the blocks set forth in the process 300 to similarly anonymize one or more other persons identified in the first image 145. For example, the anonymization server may receive a request from an agency (e.g., agency 120) to anonymize all the three persons captured in the image 155 shown in FIG. 6 so that the agency can share a redacted version of the image 155 on a social media platform. In this case, the anonymization server may repeat the process 300 to similarly generate a redacted version of the image 155 in which the facial features of the three persons as well as some of the non-facial features of the three persons captured in the image 155 are redacted to preserve their anonymity.

In accordance with some embodiments, the anonymization server 110 redacts the unredacted facial or non-facial features of the persons to be anonymized only after receiving an approval from the agency requesting the anonymization service. For example, the anonymization server 110 may transmit a notification to the agency 120 requesting the anonymization service. The notification may include a recommendation indicating that particular non-facial features (e.g., non-facial features 420, 430, 440) are to be redacted to preserve the anonymity of a person captured in the first image 145 prior to sharing the first redacted image with other agencies or on public platforms. Optionally, the notification may also include a copy of or links to other images (e.g., images 155, 165) capturing the identity of the person to be anonymized and further accessible to users not associated with the first agency 120. The notification may further include an indication that the images 155, 165 can be either publicly accessible or be accessible by one or more users not associated with the first agency. The anonymization server 110 may receive a response from the agency requesting the anonymization service. The response may include an approval to redact the non-facial features 420, 430, 440 from the first image. The anonymization server 110 then applies one or more redaction techniques to redact the non-facial features 420, 430, 440 and further transmits a redacted version (redacted image 900 shown in FIG. 9) of the first image to the first agency 120 for further sharing with other agencies or on public platforms. Optionally, the anonymization server 110 may also directly share the redacted version of the first image with other agencies or on public platforms based on a request received from the first agency 120.

As should be apparent from this detailed description, the operations and functions of the computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for anonymizing a person captured in an image, the method comprising:
   receiving, at an anonymization server, a request to anonymize a person captured in a first image, wherein the first image in an unredacted form is accessible only to one or more users associated with a first agency;
   analyzing, at the anonymization server, the first image to identify a first unredacted facial feature corresponding to the person and a first unredacted non-facial feature corresponding to the person or a background portion of the first image;
   redacting, at an anonymization server, the first unredacted facial feature captured in the first image to generate a first redacted image including a first redacted facial feature and the first unredacted non-facial feature;
   identifying, at the anonymization server, a second image which is accessible to one or more users not associated with the first agency;
   analyzing, at the anonymization server, the second image to identify a second unredacted facial feature and a second unredacted non-facial feature;
   determining, at the anonymization server, that the anonymity of the person captured in the first redacted image can be compromised using one or more unredacted features captured in the second image when the first unredacted facial feature captured in the first image matches with the second unredacted facial feature captured in the second image and the first unredacted non-facial feature captured in the first image matches with the second unredacted non-facial feature captured in the second image; and
   redacting, at the anonymization server, the first unredacted non-facial feature captured in the first redacted image to generate a second redacted image including the first redacted facial feature and a first redacted non-facial feature.

2. The method of claim 1, further comprising:
   analyzing, at the anonymization server, the first image to further identify a third unredacted non-facial feature corresponding to the person or the background portion of the first image;
   determining, at the anonymization server, that the first redacted image further includes the third unredacted non-facial feature;
   determining, at the anonymization server, that the one or more features captured in the second image do not match the third unredacted non-facial feature; and
   refraining, at the anonymization server, from redacting the third unredacted non-facial feature captured in the first redacted image when generating the second redacted image, such that, the second redacted image further includes the third unredacted non-facial feature.

3. The method of claim 1, further comprising:
   analyzing, at the anonymization server, the first image to further identify a third unredacted non-facial feature corresponding to the person or the background portion of the image;
   identifying, at the anonymization server, a third image different from the second image, wherein the third image is accessible to one or more users not associated with the first agency;

analyzing, at the anonymization server, the third image to identify a third unredacted facial feature and a fourth unredacted non-facial feature;

determining, at the anonymization server, that the anonymity of the person captured in the first redacted image can be compromised using one or more unredacted features captured in the third image when the first unredacted facial feature captured in the first image matches with the third unredacted facial feature captured in the third image and the third unredacted non-facial feature captured in the first image matches with the fourth unredacted non-facial feature captured in the third image; and redacting, at the anonymization server, the third unredacted non-facial feature captured in the first redacted image when generating the second redacted image, such that, the second redacted image includes the first redacted facial feature, the first redacted non-facial feature, and a third redacted non-facial feature.

4. The method of claim 1, wherein redacting the first unredacted non-facial feature captured in the first redacted image comprises:

selecting a segment of the first image in which the first unredacted non-facial feature is captured; and redacting the selected segment of the image.

5. The method of claim 1, further comprising:

analyzing, at the anonymization server, the first image to further identify a third unredacted facial feature corresponding to a second person;

determining, at the anonymization server, that the first redacted image further includes the third unredacted facial feature corresponding to the second person;

identifying, at the anonymization server, a third image different from the second image, wherein the third image is accessible to the one or more users not associated with the first agency;

analyzing, at the anonymization server, the third image to identify a fourth unredacted facial feature and a fifth unredacted facial feature;

determining, at the anonymization server, that the anonymity of the person captured in the first redacted image can be compromised using one or more unredacted features captured in the third image when the first unredacted facial feature captured in the first image matches with the fourth unredacted facial feature captured in the third image and the third unredacted facial feature captured in the first image matches with the fifth unredacted facial feature captured in the third image; and redacting, at the anonymization server, the third unredacted facial feature captured in the first redacted image when generating the second redacted image, such that, the second redacted image includes the first redacted facial feature, the first redacted non-facial feature, and a third redacted facial feature.

6. The method of claim 1, further comprising:

sharing the second redacted image to one or more users not associated with the first agency.

7. The method of claim 6, further comprising:

prior to sharing the second redacted image, identifying further images that are different from the second image and further accessible to one or more users not associated with the first agency; and repeating the steps of analyzing, determining, and redacting for the further identified images until the anonymity of the person captured in the second redacted image cannot be compromised using one or more unredacted features captured in the further identified images.

8. The method of claim 1, further comprising:

publishing the second redacted image on one or more social media platforms.

9. The method of claim 8, further comprising:

prior to publishing the second redacted image, identifying further images that are different from the second image and further accessible to the one or more users authorized with the first agency as well as one or more users not authorized with the first agency; and repeating the steps of analyzing, determining, and redacting for the further identified images until the anonymity of the person captured in the second redacted image cannot be captured using one or more features captured in the further identified images.

10. The method of claim 1, further comprising:

prior to redacting the first unredacted non-facial feature captured in the first redacted image, providing a notification to one or more users associated with the first agency, the notification indicating that the anonymity of the person captured in the first redacted image can be compromised using one or more unredacted features captured in the second image.

11. The method of claim 10, wherein the notification further includes an indication that the second image can either be publicly accessible or be accessible by one or more users not authorized with the first agency.

12. The method of claim 1, wherein the second image is identified at the anonymization server prior to sharing the first image or the redacted first image with one or more users not associated with the first agency.

13. An anonymization server, comprising:

a communications unit; and an electronic processor communicatively coupled to the communications unit, the electronic processor configured to:

receive, via the communications unit, a request to anonymize a person captured in a first image, wherein the first image in an unredacted form is accessible only to one or more users associated with a first agency;

analyze the first image to identify a first unredacted facial feature corresponding to the person and a first unredacted non-facial feature corresponding to the person or a background portion of the first image;

redact the first unredacted facial feature captured in the first image to generate a first redacted image including a first redacted facial feature and the first unredacted non-facial feature;

identify a second image which is accessible to one or more users not associated with the first agency;

analyze the second image to identify a second unredacted facial feature and a second unredacted non-facial feature;

determine that the anonymity of the person captured in the first redacted image can be compromised using one or more unredacted features captured in the second image when the first unredacted facial feature captured in the first image matches with the second unredacted facial feature captured in the second image and the first unredacted non-facial feature captured in the first image matches with the second unredacted non-facial feature captured in the second image; and redact the first unredacted non-facial feature captured in the first redacted image to generate a second redacted image including the first redacted facial feature and a first redacted non-facial feature.

14. The anonymization server of claim 13, wherein the electronic processor is configured to:
   analyze the first image to further identify a third unredacted non-facial feature corresponding to the person or the background portion of the first image;
   determine that the first redacted image further includes the third unredacted non-facial feature;
   determine that the one or more features captured in the second image do not match the third unredacted non-facial feature; and
   refrain from redacting the third unredacted non-facial feature captured in the first redacted image when generating the second redacted image, such that, the second redacted image further includes the third unredacted non-facial feature.

15. The anonymization server of claim 13, wherein the electronic processor is configured to:
   analyze the first image to further identify a third unredacted non-facial feature corresponding to the person or the background portion of the image;
   identify a third image different from the second image, wherein the third image is accessible to one or more users not associated with the first agency;
   analyze the third image to identify a third unredacted facial feature and a fourth unredacted non-facial feature;
   determine that the anonymity of the person captured in the first redacted image can be compromised using one or more unredacted features captured in the third image when the first unredacted facial feature captured in the first image matches with the third unredacted facial feature captured in the third image and the third unredacted non-facial feature captured in the first image matches with the fourth unredacted non-facial feature captured in the third image; and
   redact the third unredacted non-facial feature captured in the first redacted image when generating the second redacted image, such that, the second redacted image includes the first redacted facial feature, the first redacted non-facial feature, and a third redacted non-facial feature.

16. The anonymization server of claim 13, wherein the electronic processor is configured to:
   analyze the first image to further identify a third unredacted facial feature corresponding to a second person;
   determine that the first redacted image further includes the third unredacted facial feature corresponding to the second person;
   identify a third image different from the second image, wherein the third image is accessible to the one or more users not associated with the first agency;
   analyze the third image to identify a fourth unredacted facial feature and a fifth unredacted facial feature;
   determine that the anonymity of the person captured in the first redacted image can be compromised using one or more unredacted features captured in the third image when the first unredacted facial feature captured in the first image matches with the fourth unredacted facial feature captured in the third image and the third unredacted facial feature captured in the first image matches with the fifth unredacted facial feature captured in the third image; and
   redact the third unredacted facial feature captured in the first redacted image when generating the second redacted image, such that, the second redacted image includes the first redacted facial feature, the first redacted non-facial feature, and a third redacted facial feature.

17. The anonymization server of claim 13, wherein the electronic processor is configured to:
   share, via the communications unit, the second redacted image to one or more users not associated with the first agency.

18. The anonymization server of claim 13, wherein the electronic processor is configured to:
   prior to redacting the first unredacted non-facial feature captured in the first redacted image, providing, via the communications unit, a notification to one or more users associated with the first agency, the notification indicating that the anonymity of the person captured in the first redacted image can be compromised using one or more unredacted features captured in the second image.

19. The anonymization server of claim 18, wherein the notification further includes an indication that the second image can either be publicly accessible or be accessible by one or more users not authorized with the first agency.

20. The anonymization server of claim 13, wherein the second image is identified at the anonymization server prior to sharing the first image or the redacted first image with one or more users not associated with the first agency.

\* \* \* \* \*